(12) United States Patent
Chuang et al.

(10) Patent No.: US 9,703,514 B2
(45) Date of Patent: Jul. 11, 2017

(54) SMART MOBILE TAG PRINTING SYSTEM AND TAG PRINTING METHOD FOR THE SAME

(71) Applicant: TSC Auto ID Technology Co., Ltd., New Taipei (TW)

(72) Inventors: Ping-Lin Chuang, Tainan (TW); Kuo-Tung Hung, New Taipei (TW)

(73) Assignee: TSC AUTO ID TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/991,134

(22) Filed: Jan. 8, 2016

(65) Prior Publication Data
US 2017/0115938 A1 Apr. 27, 2017

(30) Foreign Application Priority Data
Oct. 23, 2015 (TW) .............................. 104134958 A (51) Int. Cl.
*H04B 5/00* (2006.01)
*H04N 1/00* (2006.01)
*G06F 3/12* (2006.01)
(52) U.S. Cl.
CPC .......... *G06F 3/1292* (2013.01); *G06F 3/1203* (2013.01); *G06F 3/1236* (2013.01)
(58) Field of Classification Search
CPC ... H04B 5/00; H04N 1/00326; H04N 1/00342
USPC ................................................ 358/1.15, 1.16
See application file for complete search history.

(56) References Cited

U.S. PATENT DOCUMENTS

| 8,189,225 B1* | 5/2012 | Lo ........................... G06F 3/122 358/1.15 |
| 2004/0020389 A1* | 2/2004 | Holmstead ............. G06K 15/00 101/484 |
| 2006/0144936 A1* | 7/2006 | Rostosky ............. G07G 1/0045 235/383 |
| 2010/0097661 A1* | 4/2010 | Hoblit ................ H04N 1/32133 358/405 |
| 2010/0309504 A1* | 12/2010 | Partridge .............. G06F 3/1293 358/1.15 |

* cited by examiner

*Primary Examiner* — Eric A Rust
(74) *Attorney, Agent, or Firm* — WPAT, PC (57) ABSTRACT

A smart mobile tag printer includes a memory unit, a NFC transfer module, a control and communication module, and a printing unit. The memory unit stores a first related information corresponding to a tag serial number of the first data set. The NFC transfer module reads a first data set from a NFC identification tag. The control and communication module downloads a second data set from a database of the back-end server to the memory unit according to the tag serial number when the control and communication module is connected with the back-end server according to a server address value of the first data set. The printing unit prints out a combination of the first data set and the first related information, or prints out a data containing the second data set.

12 Claims, 6 Drawing Sheets

FIG.5

SMART MOBILE TAG PRINTING SYSTEM AND TAG PRINTING METHOD FOR THE SAME

FIELD OF THE INVENTION

The present invention relates to a smart mobile tag printing system and a tag printing method, and more particularly to a smart mobile tag printing system and a tag printing method using a near field communication (NFC) reading technology and capable of printing out an updated data.

BACKGROUND OF THE INVENTION

Nowadays, with the developments of science and technology, barcode printers or tag printers are widely used. For example, barcode printers or tag printers have various applications in medical industries, transportation industries, retail industries, logistics and warehousing industries, manufacturing industries, entertainment industries, service industries, government agencies, post offices, courier technologies or other industries. In other words, barcode printers or tag printers become indispensable products in modern daily lives.

The barcode printer or tag printer is a machine that uses print papers of specified size and material and prints out specified contents according to a default typesetting process. Generally, the barcode printers or tag printers are classified into two types, i.e., a direct thermal printing type and a thermal transfer printing type. Moreover, the barcode printers or tag printers use specially-designed print papers and ribbons and use printheads to print out characters or images. Moreover, the print paper has an adhesive part made of adhesive material. Through the adhesive part, the print paper can be attached on a designated object to indicate the content for identification. Moreover, depending on the applications, the barcode printers or tag printers are classified into fixed-type, desktop-type or portable-type barcode printers or tag printers.

For example, in a specimen sampling task of the medical industry, the sampling worker usually uses the tag printer to produce adhesive tags in order to clearly and quickly mark the sources and types of different specimens. Moreover, in post offices or courier industries, associated business also needs to produce tags. For example, the tags are attached on parcels or letters in order to indicate the information about the receivers. Moreover, for achieving the quick and clear marking purpose, tag printers are important to produce the bus tickets, entrances or number signs for the transportation industries, the service industries or the entertainment industries and important to produce the price tags for the selling commodities of the manufacturing industries or the retail industries.

Moreover, the produced tag has a barcode. For effectively reading the barcode, a barcode reader is cooperatively used. After the information of the barcode is read by the barcode reader according to an optical technology, the information of the barcode is transmitted to a computer system. On the other hand, the portable tag printer usually cooperates with a mobile electronic device such as a smart phone, a tablet computer or a personal digital assistant. The portable tag printer and the mobile electronic device are in wireless communication with each other according to a wireless communication protocol such as a radio frequency identification (RFID) protocol, a Bluetooth protocol, a Wi-Fi protocol (e.g., the Wi-Fi protocol complying with the IEEE 802.11 standard) or a ZigBee protocol (e.g., the ZigBee complying with the IEEE 802.15.4 standard). After a command is transmitted from the mobile electronic device to the portable tag printer, the desired tag is printed out.

As known, the cooperative barcode reader has certain volume or weight, and the barcode reader has to be lengthily and precisely aligned with the barcode according to the optical scanning method. Consequently, with increasing development of a wireless communication technology, a near field communication (NFC) technology is gradually valued. The NFC technology is based on a radio frequency identification (RFID) technology. In particular, the NFC technology is a short-distance and high-frequency wireless communication technology that enables mobile electronic devices to exchange data between each other in a contactless peer-to-peer manner. Conventionally, the NFC technology provides two reading modes, including an active reading mode and a passive reading mode. Moreover, the NFC technology enables connection and communication more conveniently and more quickly.

For example, the mobile electronic device with a NFC chip can be operated with an electronic wallet, a credit card, an access control card, a bus/metro ticket card or an entrance ticket. Moreover, the mobile electronic device with a NFC reader can read associated data from an identification tag that complies with a NFC standard.

Figure 1:
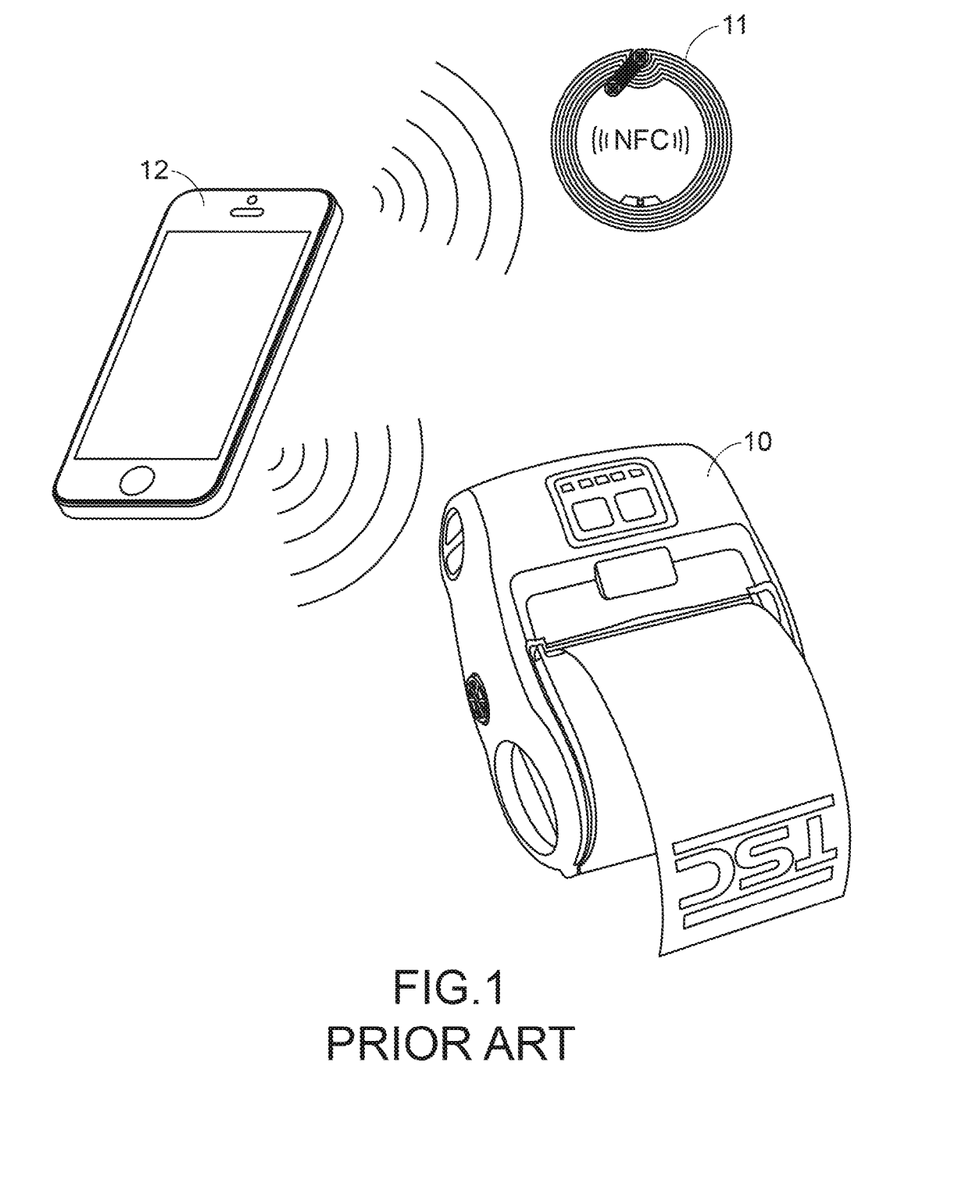
FIG. 1 schematically illustrates the application of a NFC technology on a conventional tag printer.

FIG. 1 schematically illustrates the application of a NFC technology on a conventional tag printer. As shown in FIG. 1, an identification tag 11 is produced according to the NFC technology. Moreover, the identification tag 11 has associated information contents such as the product number, the product information, the patient name and the medical history data. Moreover, a mobile electronic device 12 comprises a reader or a writer (not shown) for reading or writing the identification tag 11. That is, the mobile electronic device 12 and the identification tag 11 can exchange data according to the wireless communication protocol of the NFC technology. Moreover, the mobile electronic device 12 can read the information contents of the identification tag 11 in an active reading mode. After the mobile electronic device 12 is in wireless communication with the tag printer 10, the mobile electronic device 12 can control the tag printer 10 to print out a new tag or the added information according information contents of the identification tag 11. The printed tag can be further checked or attached.

Moreover, the identification tag 11 can be installed in another electronic device (not shown). Consequently, these two electronic devices can exchange data between each other in the contactless peer-to-peer manner. Under this circumstance, the general barcode reader can be omitted from the architecture of FIG. 1.

However, in case that both of the tag printer and the mobile electronic device are simultaneously used, the burden on the user increases. Moreover, if the fixed-type tag printer or the desktop-type tag printer is employed or there is a long distance between the tag printer and the location where the mobile electronic device reads the identification tag, it is difficult to get the printed new tag. If the portable tag printer is employed and a lot of different kinds of tags are printed, some drawbacks still occur. For example, after the contactless reading and printing processes are performed many times, the user usually confuses and makes a mistake and wonders which printed new tags and which identification tags are in pairs.

SUMMARY OF THE INVENTION

The present invention provides a smart mobile tag printing system and a tag printing method for the smart mobile tag printing system. The smart mobile tag printing system and the tag printing method use a near field communication (NFC) reading technology. The function of the general mobile electronic device to read the NFC identification tag and the function of the portable tag printer are integrated into the smart mobile tag printer of the present invention. Moreover, the terminal user can update and download the related information in the most effective way and print out the updated data.

In accordance with an aspect of the present invention, there is provided a smart mobile tag printer for a NFC identification tag and a back-end server. The NFC identification tag stores a first data set. The back-end server has a database. The smart mobile tag printer includes a memory unit, a NFC transfer module, a control and communication module, and a printing unit. The memory unit stores a first related information corresponding to a tag serial number of the first data set. The NFC transfer module reads the first data set from the NFC identification tag. The control and communication module downloads a second data set from the database to the memory unit according to the tag serial number when the control and communication module is connected with the back-end server according to a server address value of the first data set. The printing unit prints out a combination of the first data set and the first related information, or prints out a data containing the second data set.

In accordance with another aspect of the present invention, there is provided a smart mobile tag printing system. The smart mobile tag printing system includes a NFC identification tag, a back-end server and a smart mobile tag printer. The NFC identification tag stores a first data set. The back-end server has a database. The smart mobile tag printer includes a memory unit, a NFC transfer module, a control and communication module, and a printing unit. The memory unit stores a first related information corresponding to a tag serial number of the first data set. The NFC transfer module reads the first data set from the NFC identification tag. The control and communication module downloads a second data set from the database to the memory unit according to the tag serial number when the control and communication module is connected with the back-end server according to a server address value of the first data set. The printing unit prints out a combination of the first data set and the first related information, or prints out a data containing the second data set.

In accordance with a further aspect of the present invention, there is provided a tag printing method for a smart mobile tag printing system. The smart mobile tag printing system includes a NFC identification tag, a back-end server and a smart mobile tag printer. The NFC identification tag stores a first data set. The back-end server has a database. The smart mobile tag printer includes a memory unit, a NFC transfer module, a control and communication module and a printing unit. The memory unit stores a first related information corresponding to a tag serial number of the first data set. The tag printing method includes the following steps. Firstly, the NFC transfer module reads the NFC identification tag to acquire the first data set. When the control and communication module is connected with the back-end server according to a server address value of the first data set, the control and communication module downloading a second data set from the database to the memory unit according to the tag serial number. Then, the printing unit prints out a combination of the first data set and the first related information, or prints out a data containing the second data set.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2A:
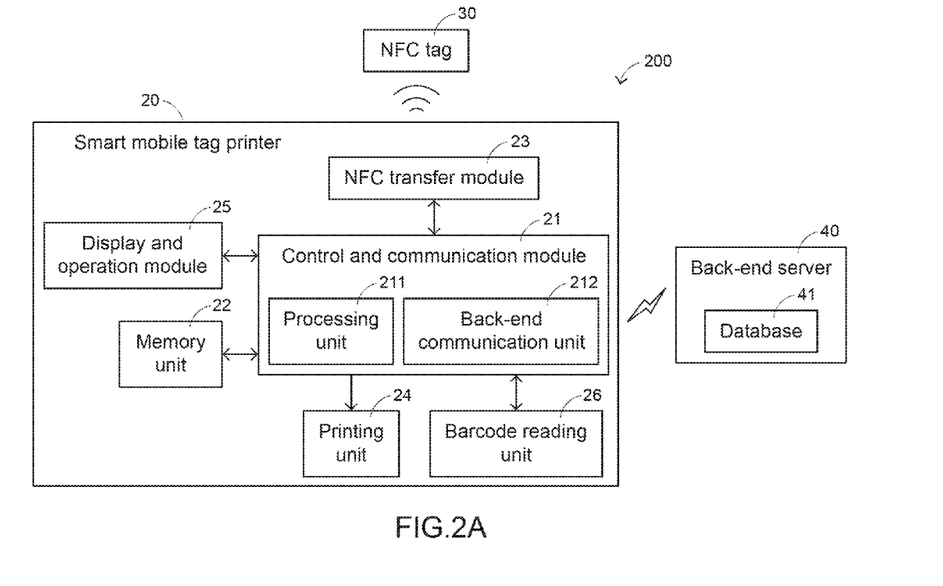
FIG. 2A is a functional block diagram illustrating a smart mobile tag printing system according to an embodiment of the present invention.

FIG. 2A is a functional block diagram illustrating a smart mobile tag printing system according to an embodiment of the present invention. As shown in FIG. 2A, the smart mobile tag printing system 200 comprises a near field communication (NFC) tag 30, a back-end server 40 and a smart mobile tag printer 20 of the present invention. The smart mobile tag printer 20 is applied to the NFC identification tag 30 and the back-end server 40. As shown in FIG. 2A, the smart mobile tag printer 20 is connected with the back-end server 40 in a wireless transmission manner.

Like the well-known technology, the NFC identification tag 30 of the present invention is produced by the NFC technology. Moreover, the NFC identification tag 30 records associated information contents such as the product number, the product information, the patient name and the medical history data. In this embodiment, the smart mobile tag printer 20 comprises a memory unit 22, a NFC transfer module 23, a control and communication module 21 and a printing unit 24. In an embodiment, the smart mobile tag printer 20 has a main body case (not shown), and these components are disposed within the main body case. In FIG. 2A, the connecting relationships between these components are presented herein for purpose of illustration and description only.

The control and communication module 21 is a control center of the smart mobile tag printer 20. In this embodiment, the control and communication module 21 comprises a processing unit 211 and a back-end communication unit 212. The back-end communication unit 212 is used for communicating with the back-end server 40. For example, the back-end communication unit 212 is in communication with with the back-end server 40 in a wireless transmission manner. It is noted that the layout of the control and communication module 21 is not restricted to the layout of FIG. 2A.

The NFC transfer module 23 is located at a front end of the main body case. The NFC transfer module 23 can exchange with the NFC identification tag 30 according to the wireless communication protocol of the NFC technology. For example, the NFC transfer module 23 is operated in an active reading mode to read the NFC identification tag 30. In addition, the printing unit 24 is located at a rear end of the main body case. The printing unit 24 has the printing function of the conventional barcode printer or tag printer. That is, the printing unit 24 is used for printing out characters or images on specially-designed print papers and ribbons in a direct thermal printing manner and a thermal transfer printing manner. Consequently, the print papers or the tags with the characters or images are printed out from the rear end of the main body case.

In addition to the functions of the portable tag printer, the smart mobile tag printer 20 further has the functions of the general mobile electronic device. Please refer to FIG. 2A again. The smart mobile tag printer 20 further comprises a display and operation module 25. The display and operation module 25 is disposed within the main body case, and partially exposed to a top surface of the main body case. When the display and operation module 25 is operated by the user, associated operating contents and operating procedures are shown on the display and operation module 25. In an embodiment, the display and operation module 25 is a touch screen. The example of the display and operation module 25 is not restricted. In another embodiment, the display and operation module 25 comprises a display screen and a user operation interface (e.g., an interface including plural function keys).

Moreover, the smart mobile tag printer 20 of the present invention reads data according to the NFC technology. However, the NFC transfer module 23 does not have the function of reading the barcode of the general tag. For providing the function of scanning and reading the barcode of the general tag, the smart mobile tag printer 20 further comprises a barcode reading unit 26. An example of the barcode reading unit 26 is an image capturing unit (e.g., a camera lens). In addition, the barcode reading unit 26 is disposed within the main body case and partially exposed to a side of the main body case. Since the general mobile electronic device is usually equipped with the camera lens, an image recognition program matching the camera lens is installed in the mobile electronic device for recognizing the barcode image that is captured by the camera lens. Consequently, the mobile electronic device has the function of reading barcodes.

In accordance with a feature of the present invention, the printing unit 24 and the NFC transfer module 23 are included in the same device. That is, the function of the general mobile electronic device to read the NFC identification tag and the function of the portable tag printer are integrated into the smart mobile tag printer 20 of the present invention. Consequently, when the user operates a single device, the function of the general mobile electronic device and the tag printing function can be achieved. Moreover, the printing unit 24 and the NFC transfer module 23 are in wireless communication with each other. Instead, the printing unit 24 and the NFC transfer module 23 are electrically connected with each other in the same device. Consequently, the efficiency of transmitting the print message is enhanced, and the problem of causing the time delay is minimized. After the reading and printing processes are performed many times, the user neither confuses nor erroneously judges the paired relationship between the identification tags of the printed new tags.

Please refer to FIG. 2A again. The back-end server 40 has a database 41. In this embodiment, the associated information contents (e.g., the product number, the product information, the patient name or the medical history data) that are stored and recorded in the NFC identification tag 30 are referred as a first data set. The first data set is a set of plural data. Depending on the applications and requirements, the first data set can be correspondingly edited and produced.

In accordance with another feature of the present invention, the first data set stored in the NFC identification tag 30 contains a tag serial number, a server address value and a variable data, and a second data set corresponding to the tag serial number is stored in the database 41. During operation, the smart mobile tag printer 20 is in contact with or close to the NFC identification tag 30 to acquire the second data set that are worthy to be referred and used by the user. On the other hand, a first related information corresponding to the tag serial number is stored in the memory unit 22.

Figure 2B:
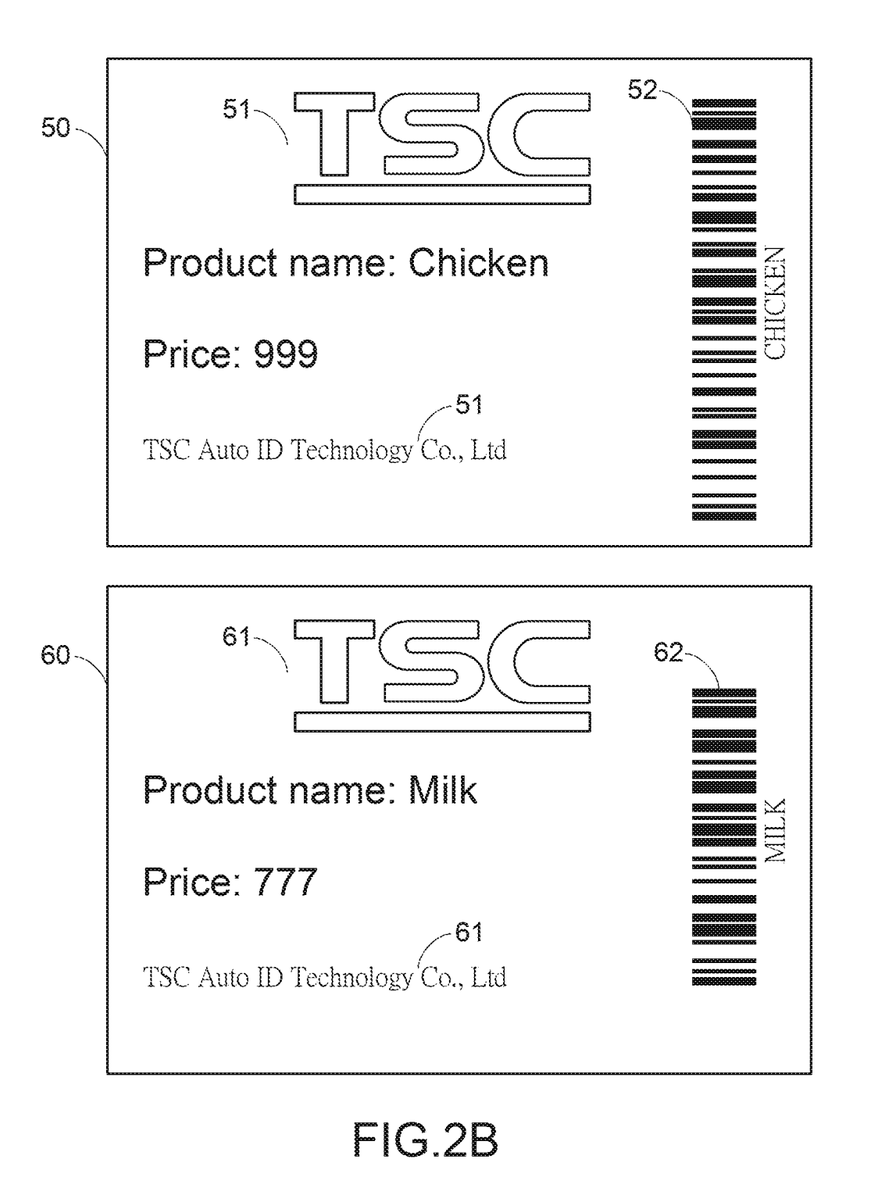
FIG. 2B schematically illustrates two tags that are printed out by the smart mobile tag printer of the present invention.

FIG. 2B schematically illustrates two tags that are printed out by the smart mobile tag printer of the present invention. In FIG. 2B, two tags 50 and 60 are printed out. The tag 50 contains the product name, the price, the associated pattern 51 and the barcode 52. The tag 60 contains the product name, the price, the associated pattern 61 and the barcode 62. As shown in FIG. 2B, the tag 50 and the tag 60 are related to two different products. For example, the tag 50 is related to chicken, and the tag 60 is related to milk. Moreover, the two tags 50 and 60 have respective tag serial numbers. Moreover, according to the design of the present invention and due to the limited storage capacity of the NFC identification tag 30, the print results and the data sources or information sources of the two tags 50 and 60 are different. In this embodiment, the contents of the product name (i.e., "Chicken" and "Milk") and the barcodes 52 and 62 are obtained from the variable data of the first data set; and the character "Product name", the character "Price", the patterns 51, 61 and the contents of the price (i.e., "999" and "777") are obtained from the second data set. In FIG. 2B, the character "Product name", the character "Price" and the patterns 51, 61 of the two tags have the same print form. It is noted that the character "Product name", the character "Price" and the patterns 51, 61 of the two tags may have different print forms. However, since the contents of product name, the contents of the price and the barcodes 52 and 62 of the two tags 50 and 60 are different, the print results of the two tags 50 and 60 are different.

In fact, the first related information is also obtained from the database 41. That is, the first related information is an old information with respect to the second data set or the updated data at the previous time. Consequently, the first related information and the second data set have the same feature. In the example of FIG. 2B, the items to be updated include the contents of the price (i.e., "999" and "777"), and the character "Product name", the character "Price" and the patterns 51, 61 of the two tags have the same print form. In another embodiment, a file with this print form is additionally stored in the memory unit 22. If the file with this print form is not stored in the memory unit 22, this file can be downloaded from the database 41. That is, the print form and the updated contents of the price can be downloaded separately.

Figure 3:
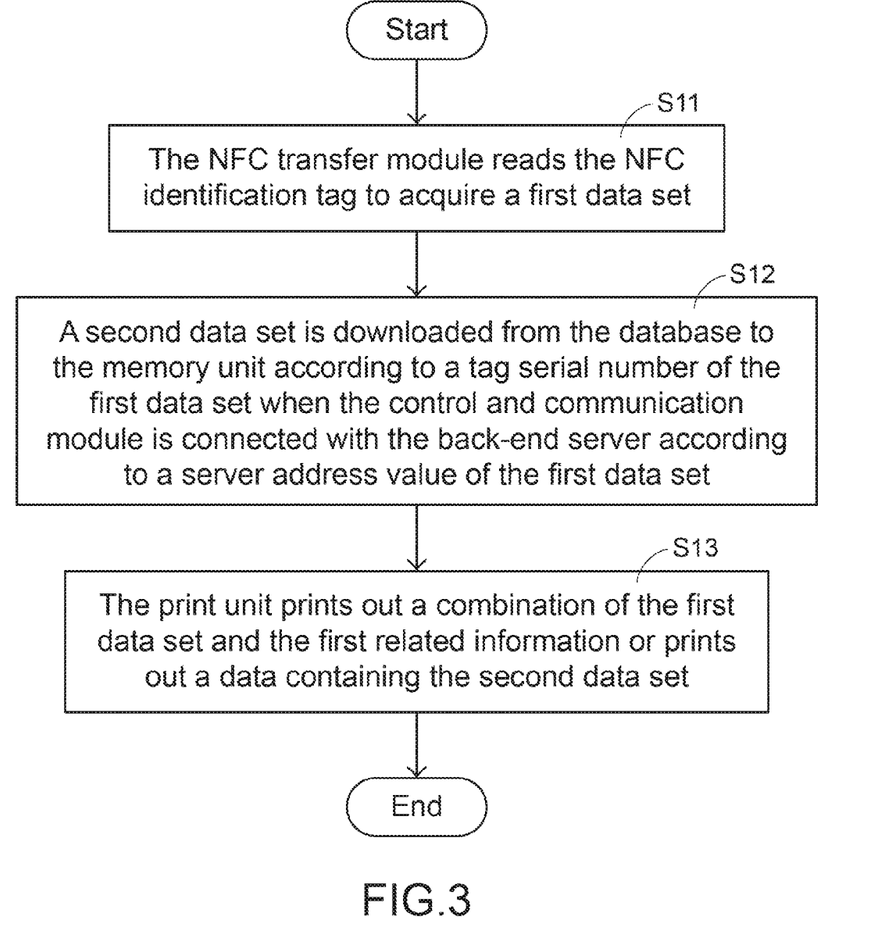
FIG. 3 is a flowchart illustrating a tag printing method according to a first embodiment of the present invention.

A tag printing method according to a first embodiment will be illustrated as follows. FIG. 3 is a flowchart illustrating a tag printing method according to a first embodiment of the present invention. The tag printing method is applied to the smart mobile tag printing system 200 of FIG. 2A and the print result of FIG. 2B.

First of all, the NFC transfer module 23 reads the NFC identification tag 30 to acquire a first data set (Step S11). Then, a second data set is downloaded from the database 41 to the memory unit 22 according to a tag serial number of the first data set when the control and communication module 21 is connected with the back-end server 40 according to a server address value of the first data set (Step S12). Then, the print unit 24 prints out a combination of the first data set and the first related information or prints out a data containing the second data set (Step S13).

In particular, the tag printing method of the present invention is applied to the identification tag in the NFC format, and the processing unit 211 of the control and communication module 21 judges the read result of the NFC transfer module 23. That is, the step S11 further comprises a step of judging the format of the read result. If the format of the read result is not the NFC format, the entire flowchart is ended to wait for the next time when the smart mobile tag printer 20 is in contact with or close to the NFC identification tag 30. Moreover, if the format of the read result is the NFC format and a NFC chip (not shown) is contained in another mobile electronic device that can exchange data with the smart mobile tag printer 20 in a peer-to-peer manner, this situation is related to the connection between the two mobile electronic devices. Under this circumstance, the subsequent steps of the flowchart of this embodiment are not continuously performed.

In this embodiment, the server address value is a link address of the back-end server 40 in the internet. Consequently, after the first data set is acquired, the back-end communication unit 212 of the control and communication module 21 is connected with the back-end server 40 according to the server address value of the first data set (Step S12). In accordance with the present invention, the second data set is related to the first data set. That is, the second data set and the first data set correspond to the same tag serial number. As mentioned in FIG. 2B, the second data set is an added information of the first data set to provide the combination data to be printed. The information or content of the second data set include characters or images.

For example, the first related information contains the old marked price (i.e., the content of the price) of a specified product, and the second data set contains a tag data such as a new marked price (i.e., the content of the price) of the specified product. The first related information and the second data set are related to the same product. That is, the first related information and the second data set are related to the same tag serial number (or the product serial number). Consequently, when the back-end communication unit 212 of the control and communication module 21 is connected with the back-end server 40, the back-end communication unit 212 searches the corresponding second data set from the database 41. After the second data set is searched, the second data sect is downloaded and stored to the memory unit 22.

In FIG. 2A, the smart mobile tag printing system 200 comprises one NFC identification tag 30 and one smart mobile tag printer 20. In some embodiments, the smart mobile tag printing system 200 comprises at least one NFC identification tag 30 and at least one smart mobile tag printer 20. That is, plural NFC tags 30 or plural smart mobile tag printers 20 are located at the terminal side. Moreover, in some embodiments, the smart mobile tag printing system 200 comprises plural back-end servers 40. In this embodiment, the smart mobile tag printer 20 is connected to the corresponding back-end server 40 and the corresponding database 41 according to the corresponding server address value. That is, after the smart mobile tag printer 20 issues a request to the back-end server 40 to acquire the related information corresponding to the tag serial number, the smart mobile tag printer 20 searches the corresponding second data set from the database 41. Moreover, the database 41 can be remotely managed. That is, the second data set in the database 41 can be updated by the supervisor. For example, the content of the price of the tag can be updated, or the print form of the tag can be updated. After the smart mobile tag printer 20 at the terminal side is connected with the database 41 to download the newest or required information, the newest or required information can be printed out.

After the second data set is downloaded, the combination of the first data set and the first related information or the second data set is selected to be printed out (Step S13). In this embodiment, the first related information is not replaced by the second data set. Moreover, all of the downloaded second data set, the read first data set and the stored first related information can be displayed on the display and operation module 25 so as to be selected as the print data by the user. For example, if the second data set is selected, the new information is acquired. Whereas, if the combination of the read first data set and the first related information (i.e., the old information) is selected, the original data in the NFC identification tag 30 and the memory unit 22 are acquired. As described in FIG. 2B, if the data containing the second data set is selected, the combination of the first data set and the second data set is printed out. It is noted that numerous modifications and alterations may be made while retaining the teachings of the invention. For example, in another embodiment, the variable data (e.g., the content of the product name and the) of the first data set corresponding to the same tag serial number are stored in the database 41 to constitute a part of the second data set. That is, the print form and other data (or information) of the tag are from the second data set. Under this circumstance, it is not necessary to print out the combination of the second data set and the first data set.

Consequently, by the tag printing method of the first embodiment, the terminal user can acquire and print out the desired information in a convenient and efficient manner. Moreover, if the related information has to be updated, the updating task is not performed by the terminal user. Instead, the data of the related information is updated by the supervisor of the database 41.

As mentioned above in this embodiment, the following situations possibly occur while the object to be printed (i.e., the first related information, the first data set or the second data set) is selected by the user. In a first situation, the corresponding data set is effectively downloaded by the smart mobile tag printer 20 or the smart mobile tag printer 20 is not effectively connected to the back-end server 40 at the previous time when the smart mobile tag printer 20 is in contact with or close to the NFC identification tag 30. Consequently, the first related information is not stored in the memory unit 22. In a second situation, the second data set is not updated. Consequently, the first related information in the memory unit 22 and the second data set in the database 41 are identical. In a third situation, regardless of whether the newest data have been downloaded or not, the smart mobile tag printer 20 can be operated and connected with the back-end server 40 to check the update status of the data. Consequently, the updated related information can be printed out in real time.

For complying with these situations, the tag printing method of the present invention may be modified while retaining the teachings of the invention. Consequently, the tag printing method is performed more efficiently so as to meet the practical requirements.

Figure 4:
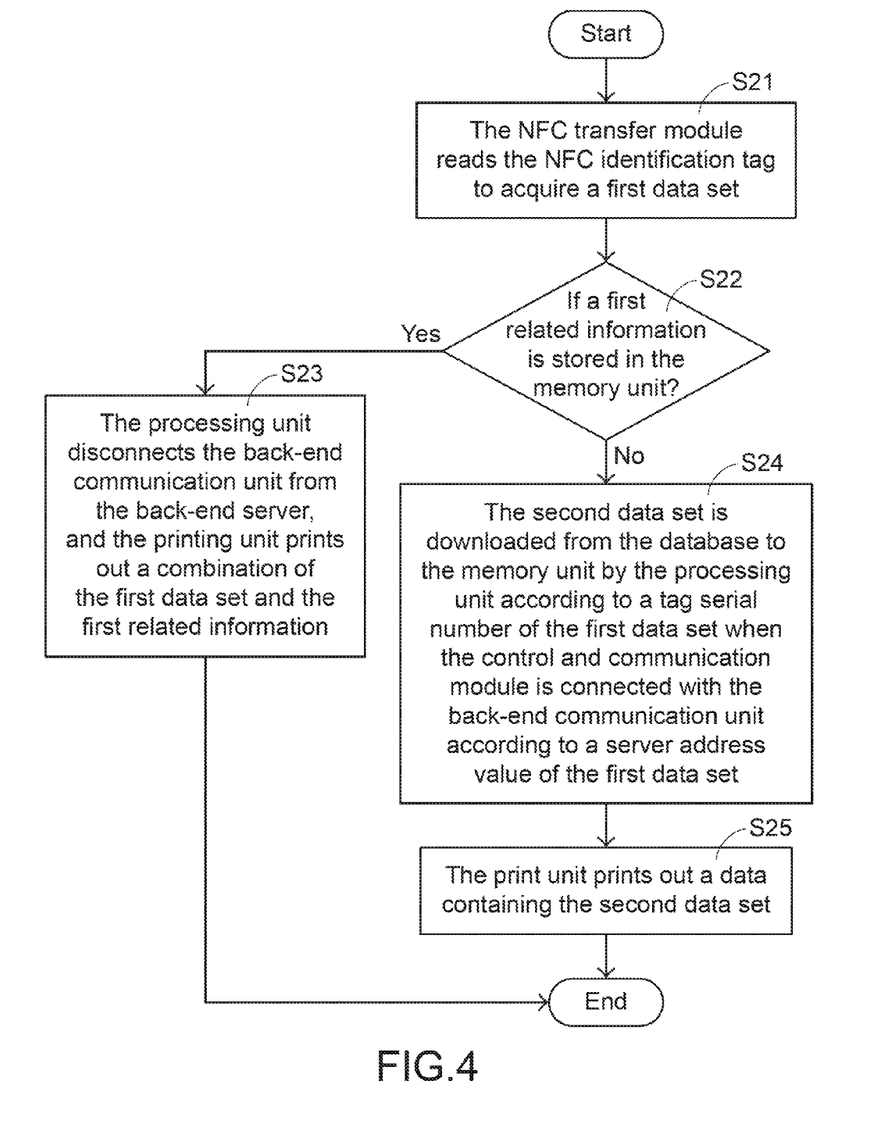
FIG. 4 is a flowchart illustrating a tag printing method according to a second embodiment of the present invention.

A tag printing method according to a second embodiment will be illustrated as follows. FIG. 4 is a flowchart illustrating a tag printing method according to a second embodiment of the present invention. The tag printing method of this embodiment is applied to the smart mobile tag printing system 200 of FIG. 2A and the print result of FIG. 2B. In comparison with the first embodiment, the processing unit 211 in the tag printing method of this embodiment has the function of judging whether the first related information is stored in the memory unit 22.

First of all, the NFC transfer module 23 reads the NFC identification tag 30 to acquire a first data set (Step S21). Then, the processing unit 211 judges whether a first related information is stored in the memory unit 22 (Step S22). If the first related information is stored in the memory unit 22, the processing unit 211 disconnects the back-end communication unit 212 from the back-end server 40, and the printing unit 24 prints out a combination of the first data set and the first related information (Step S23). If the first related information is not stored in the memory unit 22, the second data set is downloaded from the database 41 to the memory unit 22 by the processing unit 211 according to a tag serial number of the first data set when the back-end communication unit 212 is connected with the back-end server 40 according to a server address value of the first data set (Step S24). After the step S24, the print unit 24 prints out a data containing the second data set (Step S25).

The contents of the step S21 and the implementations thereof are similar to those of the step S11 of the first embodiment, and are not redundantly described herein.

As mentioned above, the corresponding data set may be have already downloaded into the memory unit 22 or not effectively downloaded to the memory unit 22 at the previous time when the smart mobile tag printer 20 is in contact with or close to the NFC identification tag 30. Consequently, in the step S22, the processing unit 211 judges whether the first related information read in the step S21 and corresponding to the tag serial number is stored in the memory unit 22. This design has following benefits and purposes. When the data set is seldom updated or the smart mobile tag printer 20 is not effectively connected to the back-end server 40, the existing related information can be checked and printed out.

In other words, the flowchart is divided into two processing procedures according to the condition of judging whether the smart mobile tag printer 20 has the first related information or not. For example, if the first related information corresponding to the tag serial number exists, the first related information is directly printed out. That is, a partial data of the first data set (e.g., the content of the product name and the barcode) and the first related information corresponding to the same tag serial number are combined together and then the combination is printed out, and the smart mobile tag printer 20 is not connected to the back-end server 40 (Step S23). Similarly, the user can operate the printing procedure through the display and operation module 25.

Whereas, if the first related information corresponding to the tag serial number does not exist, the smart mobile tag printer 20 is connected to the back-end server 40 to download the second data set (Step S24). The contents of the step S24 are substantially similar to those of the step S12 of the first embodiment, and are not redundantly described herein. On the other hand, if the smart mobile tag printer 20 has read the NFC identification tag 30 and has downloaded data from the database 41, the corresponding tag serial number is certainly stored in the memory unit 22. Under this circumstance, the step S22 is modified. That is, the step S22 is performed to judge whether the tag serial number identical to the tag serial number read in the step S21 is stored in the memory unit 22.

Moreover, in the step S24, the control and communication module 21 further judges whether a wireless network service in the surroundings is available. If the wireless network service is available, the control and communication module 21 is directly connected with the back-end server 40. Whereas, if the wireless network service is not available, the control and communication module 21 is unable to connect with the back-end server 40. Meanwhile, the flowchart is ended or an error prompt message is shown so as to wait for the next time when the smart mobile tag printer 20 is in contact with or close to the NFC identification tag 30.

Moreover, in the step S24, if the connection is interrupted or the data is not successfully downloaded or if the waiting time is too long because of some other unsolved problems, the flowchart is ended or an error prompt message is shown so as to wait for the next time when the smart mobile tag printer 20 is in contact with or close to the NFC identification tag 30. According to the general practice, the control and communication module 21 is designed to connect with the back-end server 40 after a specified waiting time period or a specified retry number of times. Consequently, if the user confirms that the control and communication module 21 is unable to connect with the back-end server 40, the user may decide whether the flowchart is ended or not.

After the second data set is downloaded, the data containing the second data set is selected to be printed out (Step S25). As described in FIG. 2B, if the data containing the second data set is selected, the combination of the first data set and the second data set is printed out. It is noted that numerous modifications and alterations may be made while retaining the teachings of the invention. For example, in another embodiment, the variable data (e.g., the content of the product name and the) of the first data set corresponding to the same tag serial number are stored in the database 41 to constitute a part of the second data set. That is, the print form and other data (or information) of the tag are from the second data set. Under this circumstance, it is not necessary to print out the combination of the second data set and the first data set. Similarly, the downloaded second data set can be displayed on the display and operation module 25 so as to be selected as the print data by the user.

In accordance with a further feature of the present invention, the new information can be downloaded and printed out, and the settings of the smart mobile tag printer 20 at the terminal side can be determined when the smart mobile tag printer 20 is connected with the back-end server 40. In particular, the read first data set further contains a setting update request command, and the downloaded second data set further contains a setting update program. When the back-end communication unit 212 is connected with the back-end server 40 according to the server address value, the back-end communication unit 212 not only issues a request to the back-end server 40 to acquire the related information corresponding to the tag serial number (i.e., the second data set) but also issues the setting update request command to the back-end server 40. Consequently, the setting update program is added to the second data set to be downloaded by the back-end communication unit 212.

In the step S25 or in the subsequent step of the step S25, the tag printing method further comprises a step of updating the print setting of the printing unit 24 by executing the setting update program. For example, the step of updating the print setting of the printing unit 24 includes the step of updating a driver of the printing unit 24 or the step of changing or adjusting the setting of the print pixels or print quality of the printing unit 24.

Consequently, by the tag printing method of the first embodiment, the terminal user can acquire and print out the desired information in a convenient and efficient manner. Even if the smart mobile tag printer 20 is in an offline mode or not connected to the back-end server 40, the existing related information can be checked and printed out.

Figure 5:
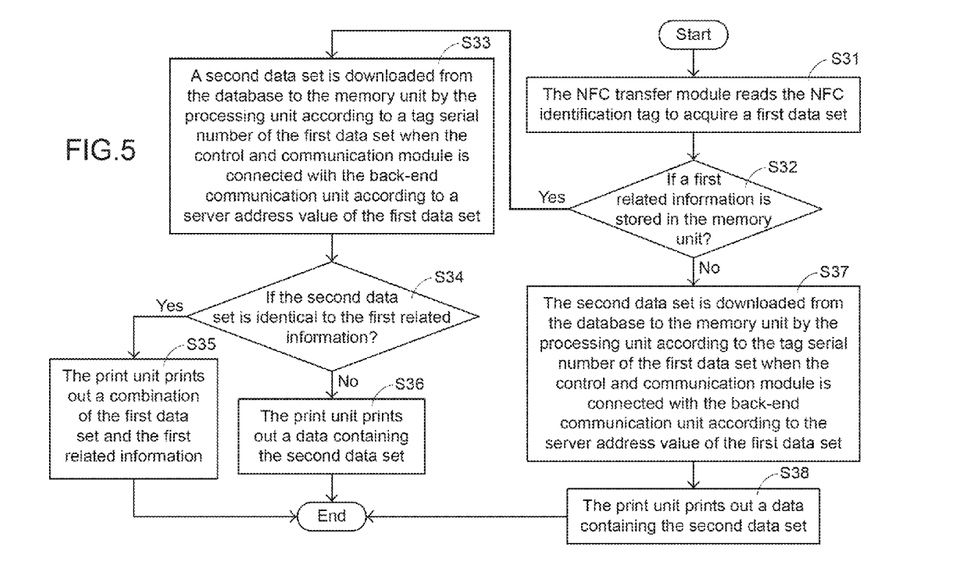
FIG. 5 is a flowchart illustrating a tag printing method according to a third embodiment of the present invention.

A tag printing method according to a third embodiment will be illustrated as follows. FIG. 5 is a flowchart illustrating a tag printing method according to a third embodiment of the present invention. The tag printing method of this embodiment is applied to the smart mobile tag printing system 200 of FIG. 2A and the print result of FIG. 2B. In comparison with the second embodiment, the procedure of downloading data from the back-end server 40 is an essential step in the tag printing method of this embodiment.

First of all, the NFC transfer module 23 reads the NFC identification tag 30 to acquire a first data set (Step S31). Then, the processing unit 211 judges whether a first related information is stored in the memory unit 22 (Step S32). If the first related information is stored in the memory unit 22, the second data set is downloaded from the database 41 to the memory unit 22 by the processing unit 211 according to a tag serial number of the first data set when the back-end communication unit 212 is connected with the back-end server 40 according to a server address value of the first data set (Step S33). After the step S33, the processing unit 211 judges whether the second data set is identical to the first related information (Step S34). If the processing unit 211 judges that the second data set is identical to the first related information, the print unit 24 prints out a combination of the first data set and the first related information (Step S35). Whereas, if the processing unit 211 judges that the second data set is different from the first related information, the print unit 24 prints out a data containing the second data set (Step S36).

If the first related information is not stored in the memory unit 22 in the step S32, the second data set is downloaded from the database 41 to the memory unit 22 by the processing unit 211 according to the tag serial number of the first data set when the back-end communication unit 212 is connected with the back-end server 40 according to the server address value of the first data set (Step S37). After the step S37, the print unit 24 prints out or prints out a data containing the second data set (Step S38).

The contents of the step S31 and the implementations thereof are similar to those of the step S11 of the first embodiment and the step S21 of the second embodiment, and are not redundantly described herein. The contents of the step S32 and the implementations thereof are similar to those of the step S22 of the second embodiment, and are not redundantly described herein.

In this embodiment, regardless of whether the first related information is stored in the memory unit 22 or not, the smart mobile tag printer 20 has to be connected with the back-end server to download the second data set. In other words, the contents of the steps S33 and S37 are identical to the contents of the step S24 of the second embodiment. This design has following benefits and purposes. When the first related information corresponding to the tag serial number is stored in the memory unit 22, the information of the second data set in the database 41 is possibly the new information. After the second data set is downloaded through network connection, the update status of the data set can be realized according to the comparison between the first related information and the second data set (Step S34). For example, the differences between the first related information and the second data set in the contents of the price and the print form are judged. If there is no difference between the first related information and the second data set, the data is not updated and then the step S35 is performed. Whereas, if there is a difference between the first related information and the second data set, the data is updated and then the step S36 is performed. Consequently, after the second data set is updated by the supervisor, the newest data can be downloaded to the smart mobile tag printer 20 at the terminal side.

The step S35 may be replaced by a step of printing out the data containing the second data set because the second data set is not updated in the step S35. That is, the result of printing out the data containing the second data set is identical to the result of printing out the combination of the first data set and the first related information. Moreover, in the step S36, the data containing the second data set is updated. Consequently, in another embodiment, the first related information is replaced by the downloaded second data set corresponding to the tag serial number.

The contents of the steps S37~S38 are similar to those of the steps S24~S25 of the second embodiment, and are not redundantly described herein.

From the above descriptions, the present invention provides a smart mobile tag printing system and a tag printing method. The function of the general mobile electronic device to read the NFC identification tag and the function of the portable tag printer are integrated into the smart mobile tag printer of the present invention. Consequently, the tag printing method can be implemented more conveniently, and the confusing problem or the erroneous printing program will be solved. Moreover, the terminal user can update and download the related information in the most effective way. In addition, the inconvenience of successively setting and updating the smart mobile tag printers at the terminal side will be eliminated.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A smart mobile tag printer for a Near Field Communication (NFC) identification tag and a back-end server, the NFC identification tag storing a first data set, the back-end server having a database, the smart mobile tag printer comprising:
   a memory storing a first related information corresponding to a tag serial number of the first data set;
   a NFC transfer reader reading the first data set from the NFC identification tag;
   a control and communication circuit downloading a second data set from the database to the memory according to the tag serial number when the control and communication circuit is connected with the back-end server according to a server address value of the first data set, wherein the control and communication circuit comprises a processor and a back-end communication circuit, the processor judges whether the first related information corresponding to the tag serial number of the first data set is stored in the memory, and the back-end communication circuit is connectable with the back-end server and comprises a wireless transmitter; and a printing unit printing out a combination of the first data set and the first related information, or printing out a data containing the second data set;

wherein if the first related information corresponding to the tag serial number is stored in the memory, the processor connects the back-end communication circuit with the back-end server, wherein if the processor judges that the second data set is identical to the first related information, the processor controls the printing unit to print out the combination of the first data set and the first related information, wherein if the processor judges that the second data set is different from the first related information, the processor controls the printing unit to print out the data containing the second data set.

2. The smart mobile tag printer according to claim 1, wherein if the first related information corresponding to the tag serial number is stored in the memory, the first related information is replaced or not replaced by the downloaded second data set corresponding to the tag serial number, wherein the second data set is permitted to be updated by a supervisor of the database.

3. The smart mobile tag printer according to claim 1, wherein the first data set further contains a setting update request command, and the second data set further comprises a setting update program, wherein when the setting update program is executed, a print setting of the printing unit is updated.

4. The smart mobile tag printer according to claim 1, further comprising a display, wherein the first data set, the first related information and/or the second data set is shown on the display, wherein the first data set, the first related information and/or the second data set are selected to be printed out by a user through the display.

5. The smart mobile tag printer according to claim 1, further comprising a barcode reading unit, wherein the barcode reading unit provides a function of scanning and reading a barcode.

6. A smart mobile tag printing system, comprising:
a Near Field Communication (NFC) identification tag storing a first data set;
a back-end server having a database; and
a smart mobile tag printer comprising:
  a memory storing a first related information corresponding to a tag serial number of the first data set;
  a NFC transfer reader reading the first data set from the NFC identification tag;
  a control and communication circuit downloading a second data set from the database to the memory according to the tag serial number when the control and communication circuit is connected with the back-end server according to a server address value of the first data set, wherein the control and communication circuit comprises a processor and a back-end communication circuit, the processor judges whether the first related information corresponding to the tag serial number of the first data set is stored in the memory, and the back-end communication circuit is connectable with the back-end server and comprises a wireless transmitter; and
  a printing unit printing out a combination of the first data set and the first related information, or printing out a data containing the second data set; wherein if the first related information corresponding to the tag serial number is stored in the memory, the processor connects the back-end communication circuit with the back-end server,
  wherein if the processor judges that the second data set is identical to the first related information, the processor controls the printing unit to print out the combination of the first data set and the first related information, wherein if the processor judges that the second data set is different from the first related information, the processor controls the printing unit to print out the data containing the second data set.

7. The smart mobile tag printing system according to claim 6, wherein if the first related information corresponding to the tag serial number is stored in the memory, the first related information is replaced or not replaced by the downloaded second data set corresponding to the tag serial number, wherein the second data set is permitted to be updated by a supervisor of the database.

8. The smart mobile tag printing system according to claim 6, wherein the first data set further contains a setting update request command, and the second data set further contains a setting update program, wherein when the setting update program is executed, a print setting of the printing unit is updated.

9. The smart mobile tag printing system according to claim 6, wherein the smart mobile tag printer further comprises a display, wherein the first data set, the first related information and/or the second data set is shown on the display, wherein the first data set, the first related information and/or the second data set are selected to be printed out by a user through the display.

10. The smart mobile tag printing system according to claim 6, further comprising a barcode reading unit, wherein the barcode reading unit provides a function of scanning and reading a barcode.

11. A tag printing method for a smart mobile tag printing system, the smart mobile tag printing system comprising a Near Field Communication NFC identification tag, a back-end server and a smart mobile tag printer, the NFC identification tag storing a first data set, the back-end server having a database, the smart mobile tag printer comprising a memory,
a NFC transfer reader, a control and communication circuit and a printing device, the memory storing a first related information corresponding to a tag serial number of the first data set, the tag printing method comprising steps of:
the NFC transfer reader reading the NFC identification tag to acquire the first data set;
the control and communication circuit downloading a second data set from the database to the memory according to the tag serial number when the control and communication circuit is connected with the back-end server according to a server address value of the first data set, wherein the control and communication circuit comprises a processor and a back-end communication circuit; and
the processor judging whether the first related information corresponding to the tag serial number is stored in the memory, wherein if the first related information corresponding to the tag serial number is stored in the memory, the processor connecting the back-end communication circuit with the back-end server; wherein if the processor judges that the second data set is identical to the first related information, the processor controlling the printing device to print out a combination of the first data set and the first related information; wherein if the processor judges that the second data set is different from the first related information, the processor controlling the printing device to print out a data containing the second data set.

12. The tag printing method according to claim 11, wherein the first data set further contains a setting update request command, and the second data set further contains a setting update program, wherein when the setting update program is executed, a print setting of the printing device is updated.

* * * * *